Figures 1, 2:
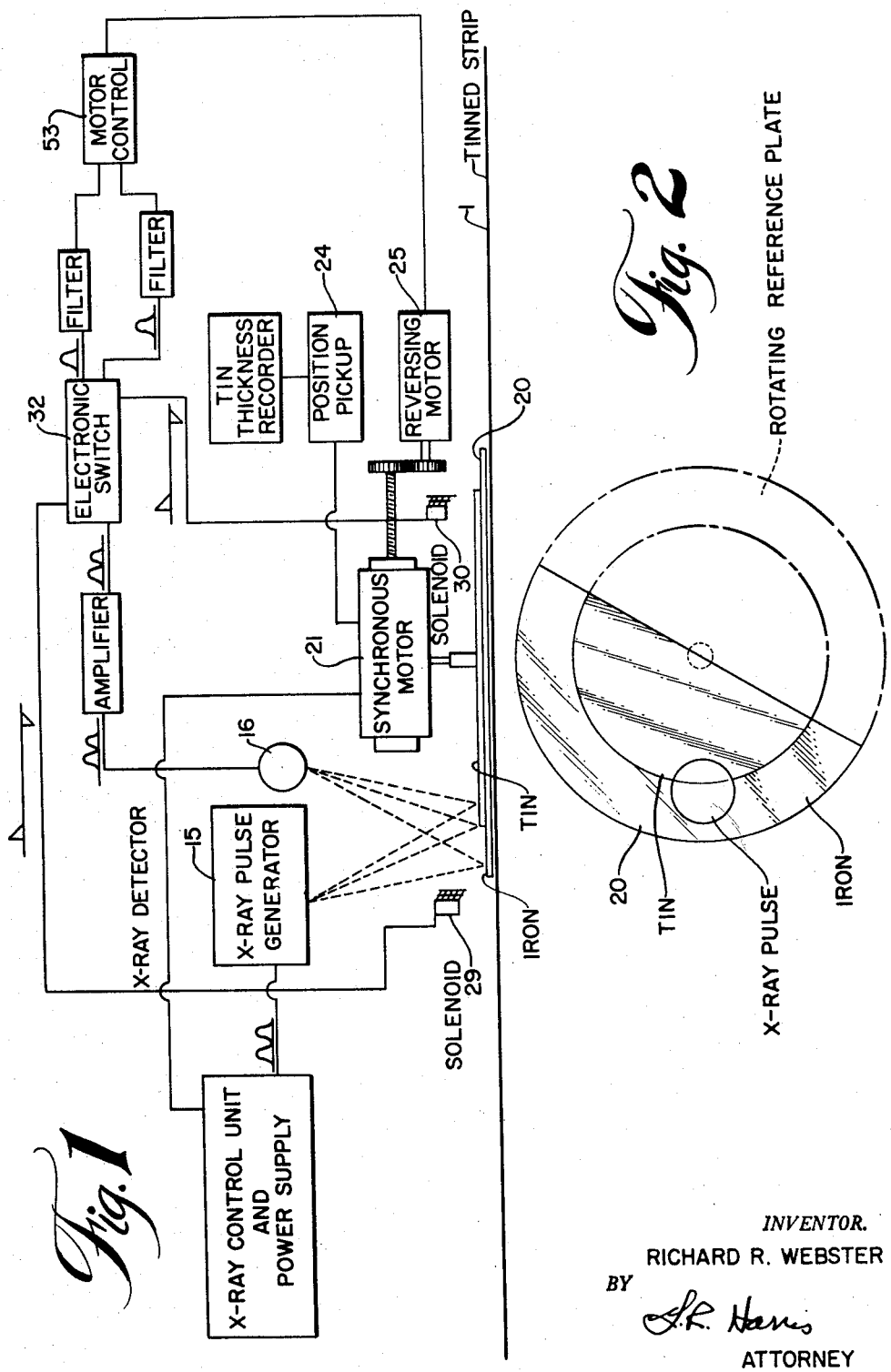

INVENTOR.
RICHARD R. WEBSTER
BY
*S.R. Harris*
ATTORNEY

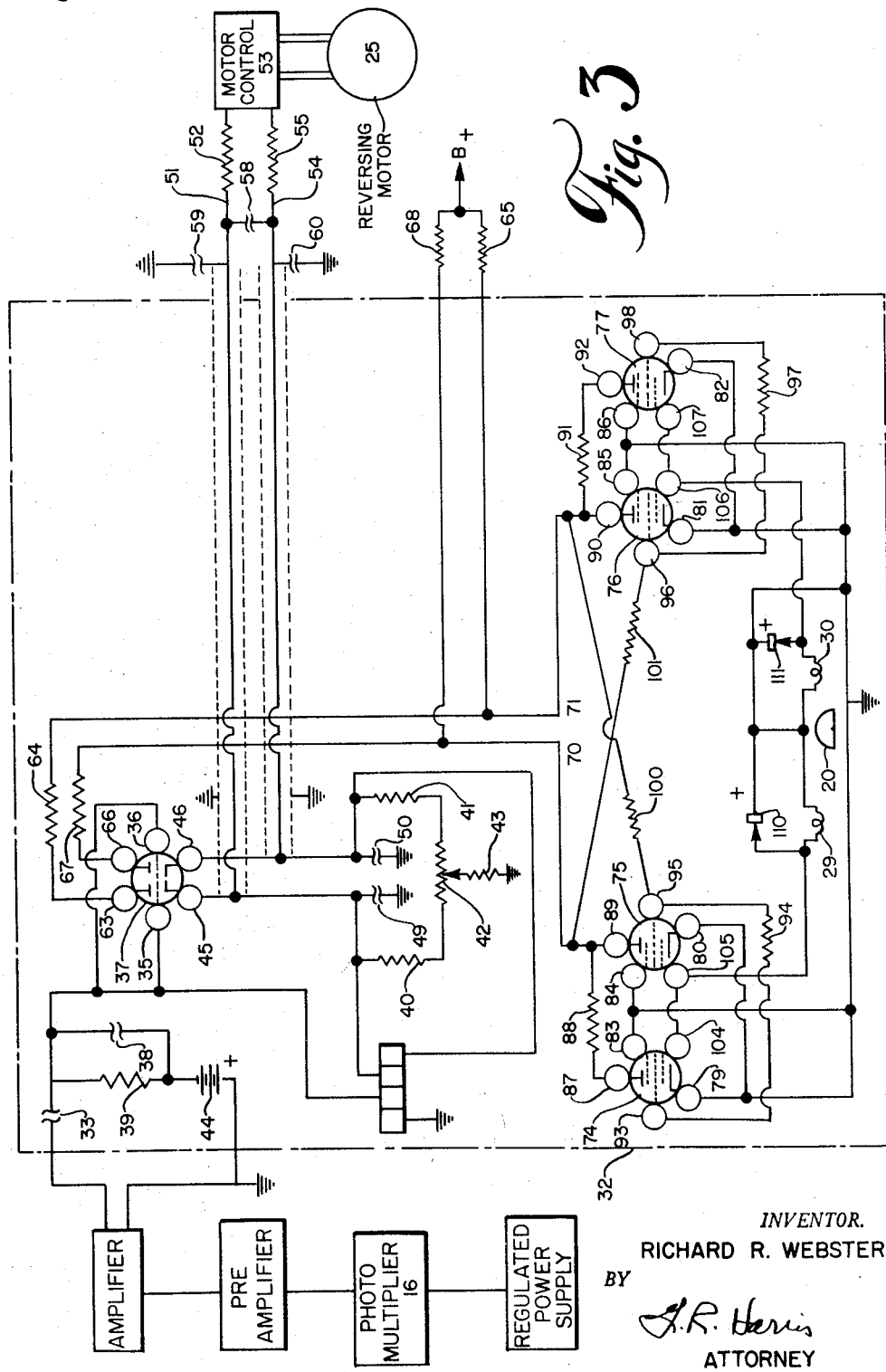

United States Patent Office

2,919,346
Patented Dec. 29, 1959

2,919,346

ELECTRONIC SWITCH

Richard R. Webster, Bethel, Pa., assignor to Jones & Laughlin Steel Corporation, Pittsburgh, Pa., a corporation of Pennsylvania Original application October 19, 1951, Serial No. 252,016, now Patent No. 2,763,784, dated July 12, 1955. Divided and this application July 6, 1956, Serial No. 596,303

2 Claims. (Cl. 250—27)

My invention relates to apparatus for converting an alternating current composed of two sets of generally similar recurring impulses into separate components. It is more particularly concerned with apparatus employing thermionic or vacuum tube elements therefor.

It is an object of my invention to provide apparatus for separating into its two components an alternating current composed of alternate pulses from two sources. It is another object to provide apparatus for separating such an alternating current into two direct currents each proportioned to pulses from a single source. Other objects will appear in the course of the description of my invention to follow.

This application is a division of my co-pending application Ser. No. 252,016 filed October 19, 1951, now Patent Number 2,763,784, for Method and Apparatus for Continuously Measuring Tin Thickness of Tinned Strip. My co-pending application deals with method and apparatus making use of the phenomenon of X-ray fluorescence. The apparatus of that application employs an X-ray tube as a source of X-rays which alternately irradiate the tinned strip to be measured and a standard sample of tin coating on a ferrous base.

This alternation proceeds at a relatively rapid rate, such as 60 times a second. The fluorescence alternately generated in the specimen and in the standard sample is directed alternately on the same detecting means which convert X-ray fluorescene into an electric current proportional in strength to the intensity of the fluorescence. I then separate the component of electric current from the detector corresponding to fluorescence from the specimen from the component of electric current from the detector corresponding to fluorescence from the standard, and compare these currents. In this way random variations in the intensity of radiation from the X-ray tube and random variations in the detector output do not impair the precision of my coating thickness measurements, since they affect specimen and standard equally and so cancel. I prefer to operate my X-ray tube so that it delivers a pulsed beam of X-rays rather than a steady beam, and to operate my apparatus so that alternate pulses of the X-ray beam irradiate specimen and standard, respectively. Such pulses produce, of course, pulses of fluorescence from the ferrous base metal of the specimen and the standard, respectively, and these pulses are detected alternately by the same X-ray detecting means as above-mentioned. Since the specimen which I wish to measure is a continuously moving strip from the electrotinning line, I direct my X-ray beam at this strip and alternately interpose between the X-ray source and the specimen and remove therefrom my standard sample in the form of a plate parallel to the strip. In this manner the specimen and standard are alternately irradiated and the alternate pulses of fluorescence from each are directed upon the same X-ray detecting means which are fixed in position with respect to the X-ray tube. I may compare the electric current from the X-ray detector corresponding to the fluorescence from the specimen with that from the standard, but I prefer to balance such currents by providing a standard so constructed that it may be moved into or out of the X-ray beam in a plane parallel to the strip and of such composition that the fluorescence generated in it by the X-ray beam varies in intensity in accordance with its relative position therein. Thus, by mechanically moving my standard I am able to balance the currents from the X-ray detector, and utilize the relative position of the standard as an index of coating thickness.

The apparatus of my present application, to be described, is particularly well adapted to separate the detector output current above-mentioned into a first component corresponding to fluorescence from the specimen and a second component corresponding to fluorescence from the standard, and will be described hereinafter in connection with this use. It will be understood, however, that this particular use is by way of example only, and not by way of limitation.

A present preferred embodiment of my invention is illustrated in the attached figures, to which reference is now made. Fig. 1 is a schematic diagram of the arrangement of the apparatus of my co-pending application Ser. No. 252,016, now Patent Number 2,763,784. Fig. 2 is a schematic plan view of the rotating standard or reference plate shown in elevation in Fig. 1. Fig. 3 is an electrical schematic of the apparatus of my invention.

The legends of Fig. 1 explain the general nature and functions of the apparatus there shown. The pulsed X-ray beam from the X-ray pulse generator 15 is directed on the tinned strip 1, but is interrupted at intervals by the semi-circular rotating standard or reference plate 20. Standard 20 is constructed, as shown in Figs. 1 and 2, of a semi-circular plate of iron having imposed thereon a smaller diameter semi-circular plate of tin. The standard 20 is rotated by a synchronous motor 21 synchronized with the power supply of the X-ray pulse generator 15. The fluorescence generated alternately in the tin plate 1 and the standard 20 is converted by my X-ray detector 16 into pulses of electric current which after amplification are then separated by an electronic switch 32 into currents proportional to fluorescence from tin plate and standard, respectively. The electronic switch 32 is triggered by impulses from solenoids 29 and 30, each containing a small permanent magnet, positioned adjacent the path of the rotating standard 20, which will be further described. The two currents from the X-ray detector operate a reversing motor 25 which moves the rotating standard 20 toward or away from the X-ray beam so as to balance the currents from the X-ray detector 16. The relative position of the rotating standard 20 with respect to the X-ray beam is electrically transmitted to a tin thickness recorder by a transducer or position pickup 24.

As I have mentioned, Fig. 3 is an electrical schematic of my invention together with certain elements of the apparatus of Fig. 1. My photomultiplier tube 16 is conventional and, therefore, is shown merely as a rectangle in the block schematic portion of Fig. 3. The electrical output of this detecting means is amplified, preferably in a pre-amplifier located adjacent the photomultiplier tube and an amplifier which may be located at some distance from the photomultiplier tube. The pre-amplifier and amplifier are also of conventional design and are not shown in detail. The output of this amplifier, which consists of pulses of current corresponding to fluorescence from the specimen as well as pulses of current corresponding to fluorescence from the rotating standard, is conducted into an electronic switch designated generally as 32, which will now be described in detail.

The current to the electronic switch 32 is introduced through a coupling capacitor 33 to the paralleled grids 35 and 36 of a twin triode vacuum tube 37. Bias is applied to the grids of this tube by battery 44 through resistor 39, which is bypassed by capacitor 38. The two cathodes 45 and 46 of twin triode 37 are connected to load resistors 40 and 41, respectively, the lower ends of which are connected to adjustable balancing resistor 42, the movable contact of which is connected through resistor 43 to ground. Cathode 45 is bypassed to ground by capacitor 49, and cathode 46 is bypassed to ground by capacitor 50. From cathode 45, shielded connector 51 leads through filter resistor 52 to motor control 53. From cathode 46, shielded connector 54 leads through filter resistor 55 also to motor control 53. Capacitor 58 is bridged between leads 51 and 54. Capacitor 59 bypasses lead 51 to ground and capacitor 60 bypasses 54 to ground. Plate 63 of twin triode 37 is connected through plate resistor 64 and resistor 65 to a source of direct voltage. Plate 66 of twin triode 37 is connected through plate resistor 67 and resistor 68 to the same source of direct voltage. A lead 70 from the junction of resistors 67 and 68 and a lead 71 from the junction of resistors 64 and 65 connect the plates 66 and 63 respectively of twin triode 37 to a trigger circuit formed by the two pairs of parallel pentodes 74—75 and 76—77, respectively.

Cathodes 79, 80, 81, and 82 of these above-mentioned pentodes are all connected to ground, as are suppressor grids 83, 84, 85, and 86. Plate 87 of tube 74 is connected through low resistance resistor 88 to plate 89 of tube 75. Likewise, plate 90 of tube 76 is connected through low resistance resistor 91 to plate 92 of tube 77. Screen 93 of tube 74 is connected through low resistance resistor 94 to screen 95 of tube 75. Screen 96 of tube 76 is connected through low resistance resistor 97 to screen 98 of tube 77. The screens 93 and 95 of tubes 74 and 75 are connected through resistor 100 to the plates 90 and 92 of tubes 76 and 77 and likewise the screens 96 of tube 76 and 98 of tube 77 are connected through resistor 101 to the plates 87 of tubes 74 and 89 of tube 75. Plates 87 and 89 of tubes 74 and 75 are connected to lead 70 and plates 90 and 92 of tubes 76 and 77 are connected to lead 71. Control grid 104 of tube 74 is connected to control grid 105 of tube 76 as well as one terminal of solenoid 29. Control grid 106 of tube 76 is connected to control grid 107 of tube 77 and also to one terminal of solenoid 30. The other terminals of solenoids 29 and 30 are connected together and to ground. Connected across solenoid 29 is diode 110 and connected across solenoid 30 is diode 111. These diodes may be thermionic or may be of silicon, germanium, or other semi-conductor.

Motor control 53, which is of conventional design, supplies power to reversing motor 25, which operates as a balancing motor, as has been mentioned.

The method of operation of my X-ray pulse generator and my rotating standard is fully described in my co-pending application Ser. No. 252,016, now Patent Number 2,763,784. The operation of my photomultiplier tube used as a scintillation counter is conventional, as well as is the operation of my pre-amplifier and amplifier. The operation of my electronic switch 32 is novel, however, and will now be described. The cathode load resistors 40 and 41 of my twin triode 37 are of values equal to or greater than the plate resistance of this tube. The bias provided by battery 44 is adjusted to compensate in part for the voltage drop caused by the flow of plate currents through cathode resistors 40 and 41 so that each triode section of tube 37 tends to operate as a detector of the well-known "infinite impedance" type. This tube, therefore, converts the pulsating current from the photomultiplier tube amplifier into direct currents which are applied through resistance-capacitance filters to motor control 53. In the absence of the trigger circuit composed of the two paralleled pentode pairs 74—75, and 76—77, the outputs of the two cathodes of tube 37 would be identical and would each consist of direct current corresponding to fluorescence from the specimen and fluorescence from the standard. The purpose of the trigger circuit is to discriminate between currents corresponding to fluorescence from these two sources and to control the operation of tube 37 so that the output of one cathode consists of current corresponding to fluorescence from the specimen only and the output from the other cathode consists of current corresponding to fluorescence from the rotating reference plate only. The action of this trigger circuit is explained in detail in an article "Design and Use of Directly Coupled Pentode Trigger Pairs" by Victor H. Regener, published in The Review of Scientific Instruments for May 1946. It is therefore unnecessary here to explain the theory of operation of this trigger circuit. As it is used in my apparatus, when a signal is applied to the control grids 104 and 105, for example, of tubes 74 and 75, these tubes draw plate current through resistor 68. The corresponding voltage drop through resistor 68 resulting therefrom considerably reduces the plate voltage on plate 66 of twin triode 37 and therefore cuts off plate current flow in this triode portion of the tube. Plate current continues to flow in tubes 74 and 75 until the application of a signal to control grids 106 and 107 of tubes 76 and 77 causes these tubes to conduct and tubes 74 and 75 to cut off. When this happens, the increased voltage drop through resistor 65 greatly reduces the voltage on plate 63 of twin triode 37 and causes the plate current of this section of the tube to cut off. At the same time the greatly reduced voltage drop through resistor 68 permits the application of full voltage to plate 66 and the flow of plate current in this triode portion of tube 37. The signals applied to the control grids of each pair of tubes in my trigger circuit are synchronized with the rotation of my rotating standard so that one triode section of twin triode 37 is operative only on current pulses corresponding to fluorescence from the specimen, and the other triode section is operative only on current pulses corresponding to fluorescence from the standard. Thus, the output currents from the twin triode sections of tube 37 correspond to specimen fluorescence and standard fluorescence, respectively, and these currents, amplified if required by motor control 53, cause balancing motor 25 to rotate in one direction when the specimen current is stronger and in the other direction when the standard current is stronger.

The signal voltages operating my trigger circuit are supplied by solenoids 29 and 30. When the leading edge of my semi-circular standard 20 passes solenoid 29, which contains a small permanent magnet, the reduction in reluctance of the magnetic field path caused by the presence of the ferrous base of the standard produces a change in the magnetic field surrounding this solenoid which generates a steep-fronted voltage pulse. This voltage pulse from solenoid 29 is applied to control grids of tubes 74 and 75 as is shown in the circuit of Fig. 3. Similarly, when the leading edge of my rotating standard 20 approaches solenoid 30, a similar pulse is applied to the control grids of tubes 76 and 77. Diodes 110 and 111 are connected across solenoids 29 and 30, in such fashion that they do not conduct the current corresponding to the voltage pulses above-mentioned. These diodes do conduct, however, currents corresponding to the negative pulses generated in solenoids 29 and 30 when the trailing edge of my semi-circular standard 20 passes each solenoid respectively. The negative pulse from each solenoid is thus damped out and does not effect my trigger circuit.

I claim:

1. Apparatus for separating into its two components an alternating electric input composed of alternate pulses from two sources, comprising a pair of thermionic units each including at least a grid, a plate, and a cathode, the grids being connected together and to one input terminal, a separate load resistor between each cathode and ground, a source of bias voltage connected between grids and ground, a separate output connection from each cathode, a resistor connected between each plate and a source of plate voltage, and means connected between each plate and ground for alternately shunting each plate so as to reduce the plate voltage and cut off the plate current, these means being actuated in synchronism with the alternate input pulses.

2. Apparatus for separating into its two components an alternating electric input composed of alternate pulses from two sources and simultaneously rectifying such components, comprising a pair of thermionic units each including at least a grid, a plate, and a cathode, the grids being connected together and to one input terminal, a separate load resistor connected between each cathode and ground, a source of bias voltage sufficient to bias the thermionic units beyond the linear portion of their grid voltage-plate current characteristic, connected between grids and ground, a separate output connection from each cathode, a resistor connected between each plate and a source of plate voltage, and means connected between each plate and ground for alternately shunting each plate so as to reduce the plate voltage and cut off the plate current, these means being actuated in synchronism with the alternate input pulses.

References Cited in the file of this patent

UNITED STATES PATENTS

| 2,482,759 | Goodrich et al. | Sept. 27, 1949 |
| 2,713,119 | Adler | July 12, 1955 |